United States Patent [19]

Van de Moortele

[11] Patent Number: 4,522,229

[45] Date of Patent: Jun. 11, 1985

[54] SAFETY DEVICE FOR WATER-PIPES

[75] Inventor: Guido Van de Moortele, Antwerp, Belgium

[73] Assignee: Standard Société Anonyme, Luxemburg, Luxembourg

[21] Appl. No.: 638,102

[22] Filed: Aug. 3, 1984

[30] Foreign Application Priority Data

Aug. 10, 1983 [BE] Belgium ............................ 2/60179

[51] Int. Cl.³ ............................................ F16K 17/00
[52] U.S. Cl. .................................. 137/460; 137/462; 137/498
[58] Field of Search ................... 137/460, 462, 498

[56] References Cited

U.S. PATENT DOCUMENTS 2,659,383 11/1953 Frager .................................. 137/460
3,481,362 12/1969 Dollison ............................... 137/460
4,167,194 9/1979 Matsuda ............................ 137/462 X Primary Examiner—Harold W. Weakley
Attorney, Agent, or Firm—Berman, Aisenberg & Platt

[57] ABSTRACT

The safety device makes it possible to cut the water supply off quickly when there is a very low flow of water such as occurs when there is a leak, to cut off the water supply after predetermined time with normal water consumption, and to cut the water supply off very quickly when a certain predetermined maximum flow is exceeded as would occur with a fractured pipe. The safety device is automatically returned to its initial position when the water consumption is stopped and the shut off is first indicated by a significant reduction in flow. The device can also be manually returned to its initial position after a shut-off.

5 Claims, 10 Drawing Figures

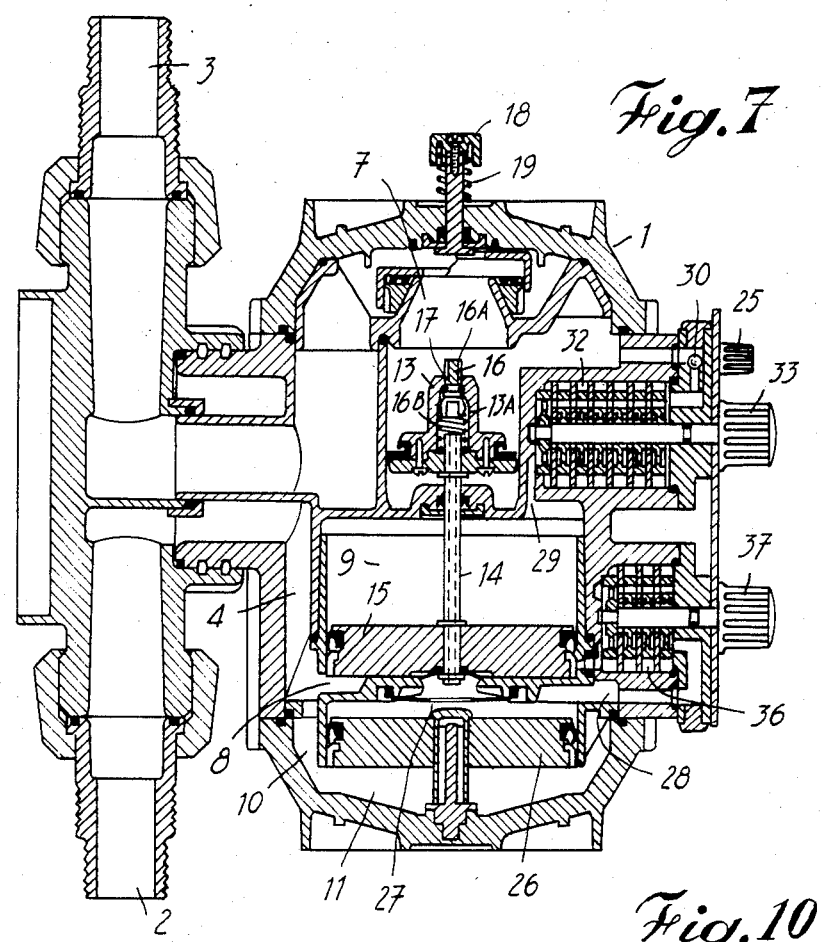
Fig. 7
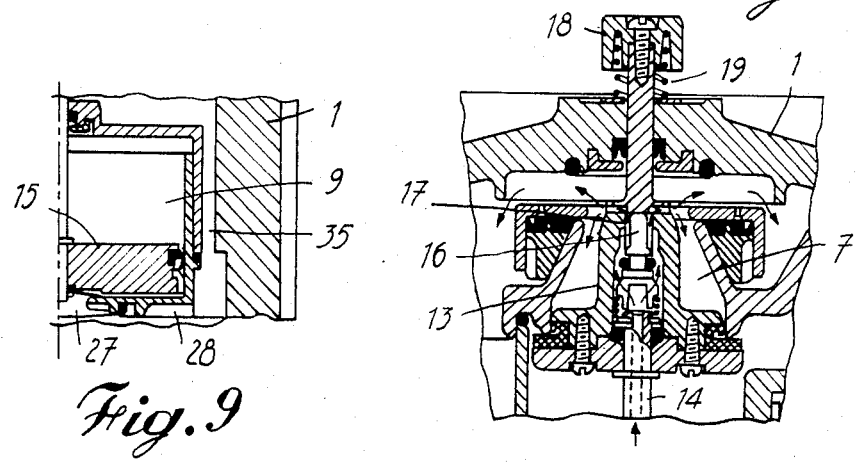
Fig. 9
Fig. 10

SAFETY DEVICE FOR WATER-PIPES

The invention concerns a safety device which cuts off the water supply to appliances using water when leaks occur, pipes break, or in case of unexpected water consumption.

German Pat. No. 1.503.878 describes a safety device which offers only safety when specific pressure differences in a water pipe appear in conjunction with a specific excessive flow of water. This device, however, offers no way of controlling the closing-off of the water supply, when a leak, break, or unexpected water consumption occurs.

According to the invention in order to eliminate these drawbacks, an extremely sensitive safety device has been devised which makes it possible to quickly close off the water supply when there is a very slow flow of water such as occurs with a leak, to close off the water supply after a predetermined time at a normal water flow rate, and to close off the water supply very quickly after a predetermined maximum flow as may occur after the breaking of a pipe. The safety device also returns automatically to its original position when the water consumption is stopped and is preceded by a significant reduction in flow rate. The device can also be manually returned to its original position after a possible close-off.

According to the principal feature of the invention the safety device consists primarily of a housing equipped with an inlet connected to the water supply pipe and with an outlet connected to a water discharge pipe, in the housing a supply chamber which is connected to a discharge chamber which leads into the outlet, which supply chamber is also connected to a measuring chamber and a precontrol chamber, a valve installed between the supply and discharge chambers, a shut-off valve installed between the discharge chamber and the outlet, which shut-off valve forms part of a diaphragm installed in the measuring chamber, a push-down reset valve installed in the discharge chamber to apply pressure to the outlet and to open the shut-off valve, a push-button for pressing down the reset valve, an adjustable valve installed between the discharge chamber and the upper part of the measuring chamber for setting the desired water consumption, a reset diaphragm installed in the precontrol chamber for closing off an opening provided between this chamber and the measuring chamber, a channel provided between the discharge chamber and the precontrol chamber, a second channel provided between the discharge chamber and the precontrol chamber, an opening provided between the measuring chamber and the first channel mentioned, a valve for closing the first channel mentioned close to the discharge chamber, a valve for closing the first channel mentioned between the precontrol chamber and the opening of the measuring chamber, a regulating means for adjusting the flow rate between the measuring chamber and the discharge chamber and for adjusting the shut-off speed of the shut-off valve, and a flow regulator installed between the upper part of the precontrol chamber and the discharge chamber for adjusting the flow in the by-pass channel of the device.

By way of example, but which has no restrictive character, a more exhaustive description of the safety device and its operation in accordance with the invention is given below. Here the action which leads to the shutting off of the water supply when there is a low or too small flow or by means of a flow regulator which can be preset, is referred to as the operational phase. Similarly the action which leads to a rapid shutt-off of the water supply at an adjustable maximum flow rate, for example when a pipe breaks, bears the same name. The automatic return of the device to the original position when the water consumption is stopped, as well as the manual resetting of the device, is referred to as the reset phase.

This description refers to the attached drawings where:

FIG. 1 gives a diagrammatic representation of the safety device in the reset phase;

FIG. 2 gives a diagrammatic representation of the safety device at the start of the operational phase, when there is low water consumption or a leak in the connected appliances;

FIG. 3 gives a diagrammatic representation of the safety device in the operational phase, when there is normal water consumption or when there is a break in the water circuit of the connected appliances;

FIG. 4 gives a front view of a chosen embodiment of the safety device;

FIG. 5 gives a side view of the same;

FIG. 6 gives a plan view of the same;

FIG. 7 gives a longitudinal section of the safety device where the head has been turned 90° with respect to the supply and discharge pipe;

FIG. 9 shows a section along the line IX—IX of FIG. 6;

FIG. 10 shows an enlarged partial section of the upper part of the device, where the non-return valve is closed.

Figure 1:
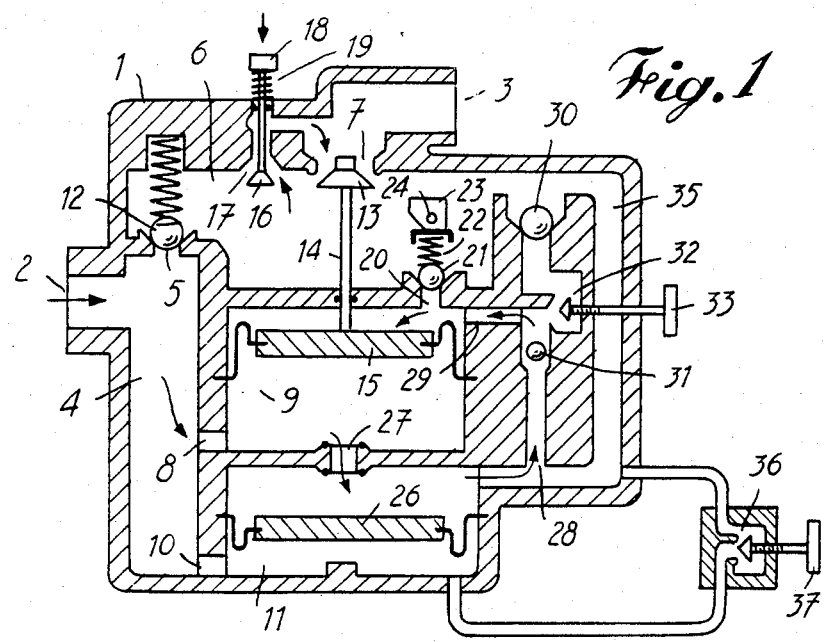
Figure 2:
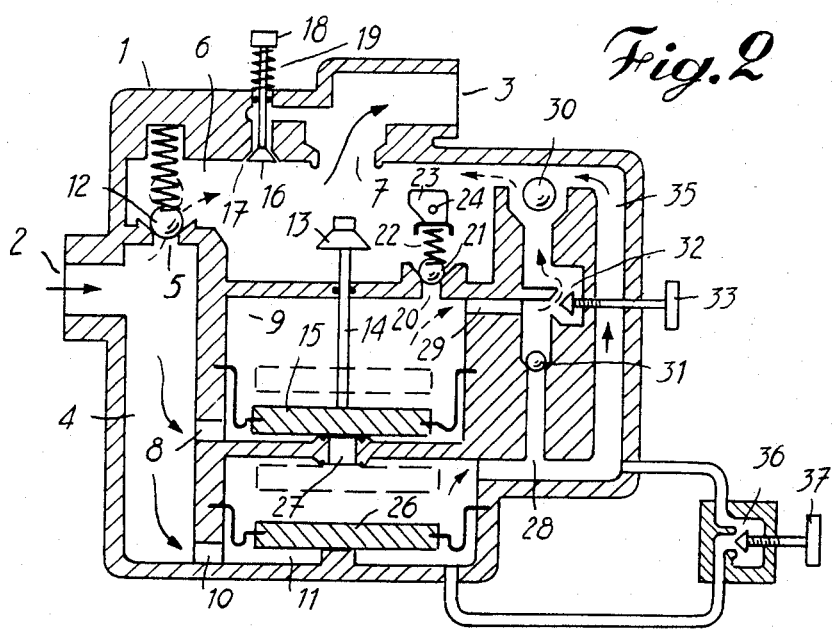
Figure 3:
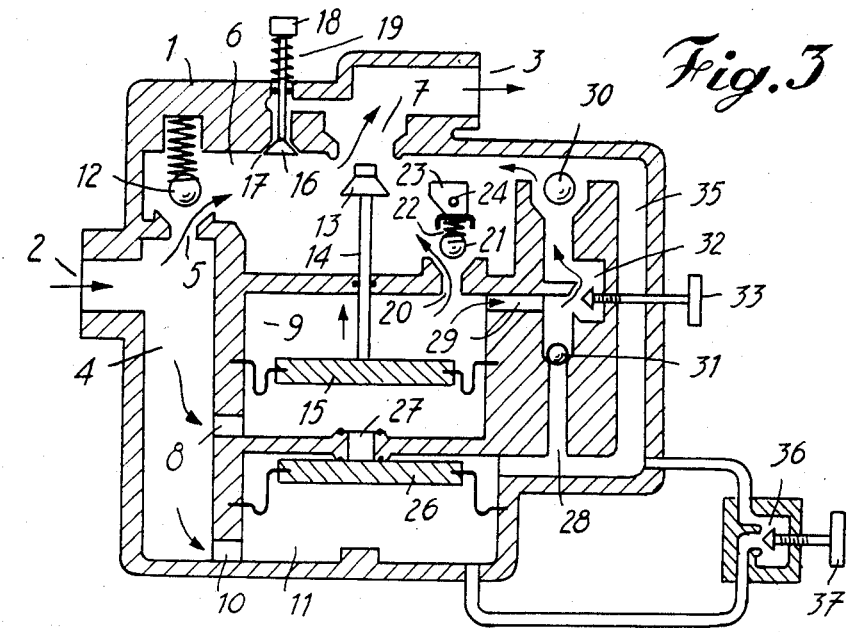
Figure 4:
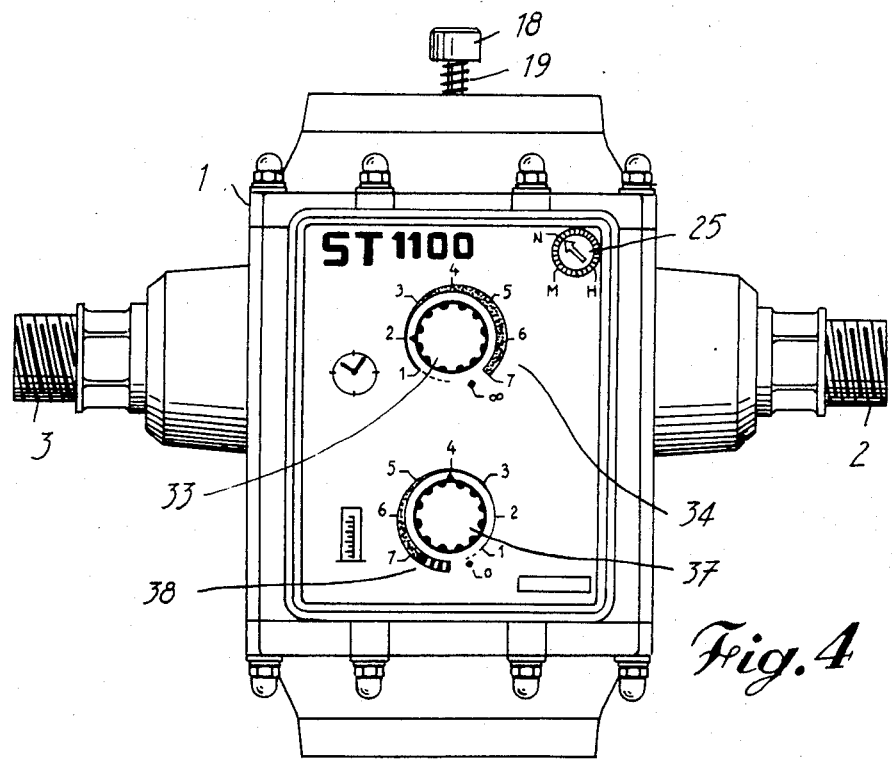
Figure 5:
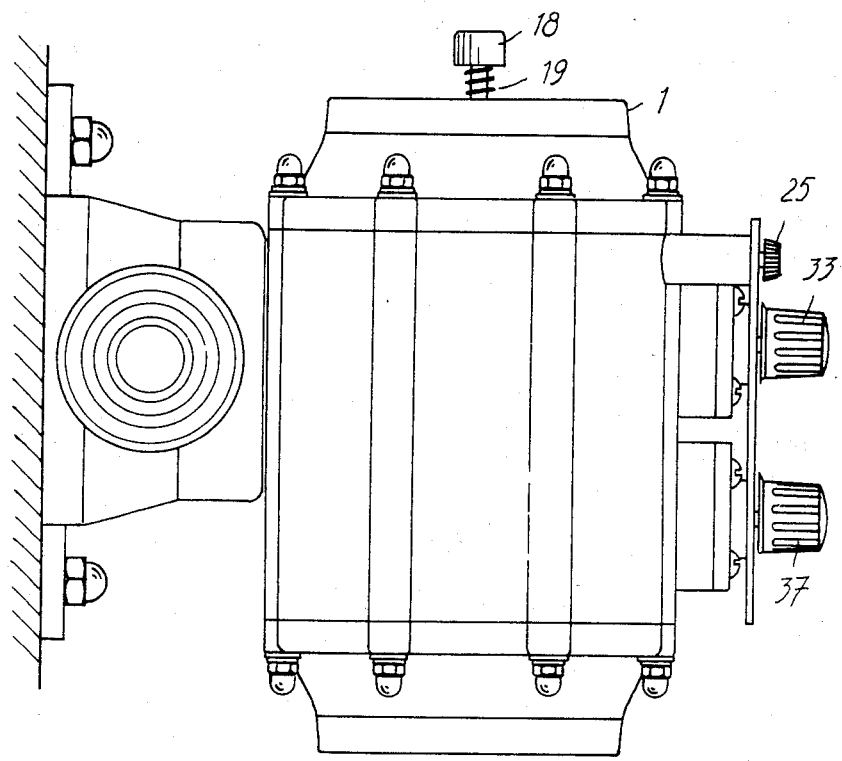
Figure 6:
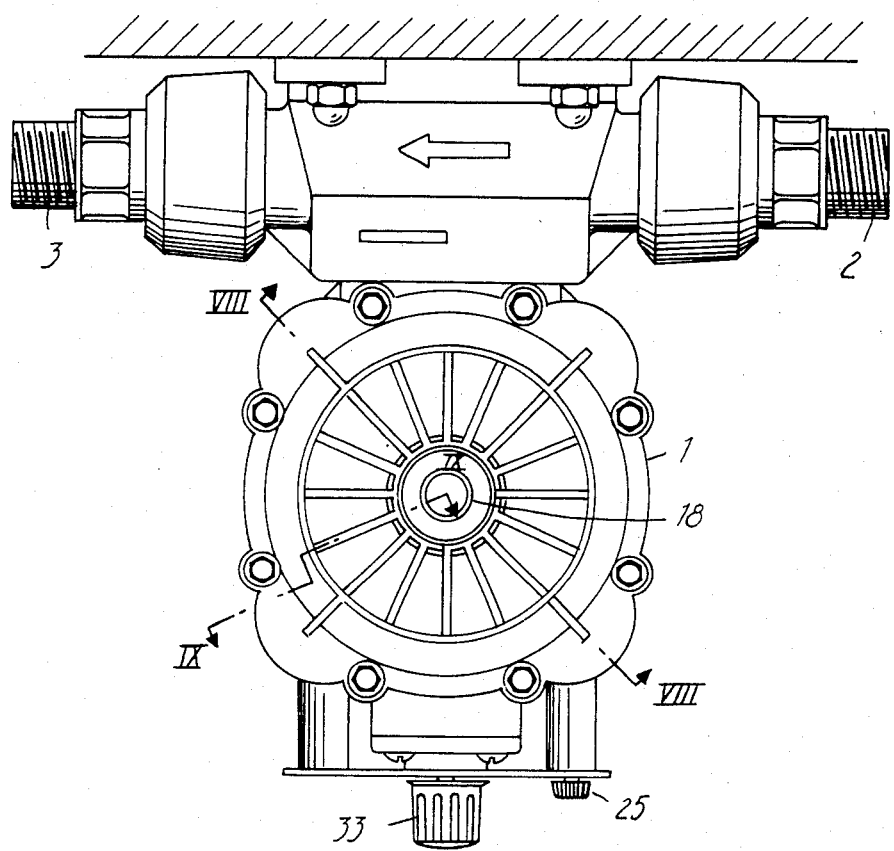
Figure 8:
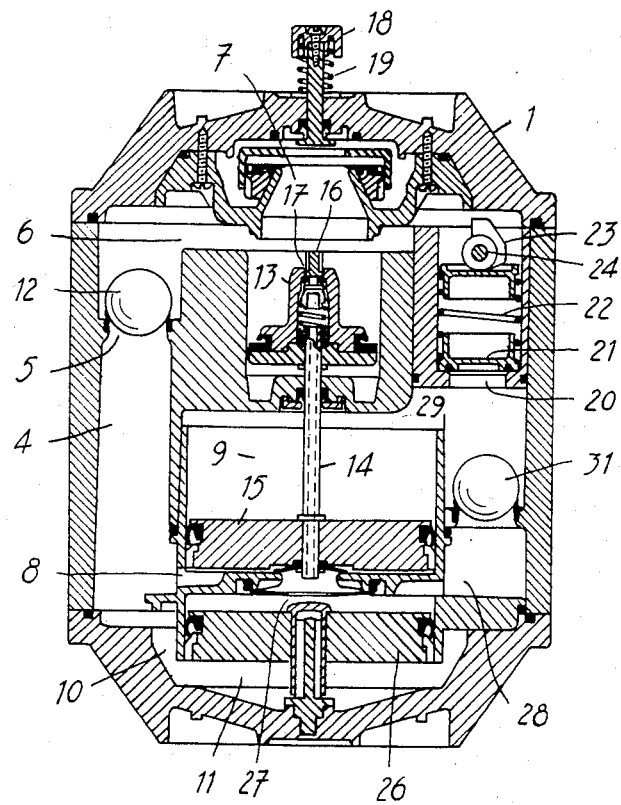
FIG. 8 shows a section along the line VIII—VIII of FIG. 6.

In these figures it can be seen that the safety device consists of a housing 1 with an inlet 2 connected to a water pipe and an outlet 3 to which a water-using appliance is connected. The inlet 2 leads into a supply chamber 4 which is connected by an opening 5 to a discharge chamber 6, which is in turn connected by an opening 7 to outlet 3 connected to the water pipe of a water-consuming appliance. The supply chamber 4 is similarly connected by an opening 8 to the lowest part of a measuring chamber 9 and by an opening 10 to the lowest part of a precontrol chamber 11. Opening 5 between the supply chamber 4 and the discharge chamber 6, can be closed by a ball valve 12 which may or may not work in conjunction with a pressure spring and which can be opened by water flowing in supply chamber 4 at a certain pressure. As shown in FIGS. 1 to 3, opening 7, fitted between discharge chamber 6 and the outlet 3 of housing 1, can be closed by a shut-off valve 13 fitted on rod 14 of a diaphragm 15 which is installed in measuring chamber 9. Between the discharge chamber 6 and the outlet 3 of housing 1 there is also an opening 17 which can be closed by a push-down reset valve 16. To this end the reset valve 16 is provided with a push-button 18 and a pressure spring 19 is installed between the housing 1 and the said push-button which normally keeps the reset valve shut. This reset valve serves to make the device operational again after shut-off valve 13 has closed off the water supply. In the embodiment shown in FIGS. 4 to 10, the hollow rod 14 has been installed in the shut-off valve 13, which can be moved vertically up and down, connecting the measuring chamber 9 to hollow space 13A provided in the shut-off valve, which space is connected via opening 17 to outlet 3. This opening 17 can, however, be closed by the reset valve 16 which can be moved axially and is provided with several longitudinal openings 15A along its perimeter, which free opening 17 when reset valve 16 is in a certain position. This valve is kept closed by a pressure spring 16B fitted in hollow space 13A. The push-button 18 is centrally installed and works in conjunction with the reset valve 16 when cut-off valve 13 is in a particular position. An opening 20 is provided between the discharge chamber 6 and the measuring chamber 9, which opening is shut off by an adjustable valve 21. This valve is kept closed by a pressure spring 22, the pressure of which can be adjusted by a rotating cam 23 mounted on a spindle 24. On this spindle there is a regualting knob 25 which is used to select in a once-only operation the expected water consumption whether normal, moderate or high, depending on the number of consumers or the number of appliances using water connected to the pipe. By making this setting it can be determined at what flow rate the water supply will be accelerated cut off. In the precontrol chamber 11 is a precontrol diaphragm 26 which serves to close off or open an opening 27 between the precontrol chamber 11 and the measuring chamber 9 and which makes a certain comparison, so that the opening 27 is closed at the beginning of the operational phase, and this opening is only opened in the reset phase. The upper part of the precontrol chamber 11 is connected, via a channel 28 and opening 29, to the upper part of the measuring chamber 9. In channel 28 there is valve 31 for the admission of water during the reset phase. Between the discharge chamber 6 and the upper part of the measuring chamber 9 there is a ball valve 30 and a regulating means 32 with a rotating knob 33, which controls the flow of the water from the measuring chamber 9, above the measuring diaphragm 15, so that the water flows faster or slower from the measuring chamber 9 through opening 29, consequently determining the speed at which diaphragm 15 rises in measuring chamber 9 and the shut-off valve 13 shuts off opening 7. On the calibrated scale 34 of the device are numbers which in practice correspond to a water consumption of 2 to 7 minutes, after which time the device will shut off the water supply. A second channel 35 is provided between the discharge chamber 6 and the upper part of the precontrol chamber 11, which serves to drain this chamber at the beginning of the operational phase. Between the supply chamber 4 and the lower part of the measuring chamber 9 and the precontrol chamber 11 on the one hand, and the discharge chamber 6 on the other hand, there is a flow regulator 36 fitted with a rotating knob 37, which makes it possible to control the flow rate of the device. A calibrated scale 38 is provided so that the knob 37 can be turned to the desired position. The flow rate regulating means 32 and the flow regulator 36 both consist of a series of fixed discs with openings, fitted in a housing and between them a series of labyrinth discs with openings fitted on a rotating spindle, as described in another patent application of the applicant. When this spindle is turned all the openings can be turned so that they are in the same straight line, so that the water chooses the shortest route and the flow rate is the greatest or the labyrinth discs can be turned so that all the openings in the fixed discs lead into the labyrinth channels of the labyrinth discs, making the length of the route to be followed by the water adjustable and consequently the flow rate of the water adjustable as well.

A very good result can be obtained when the precontrol diaphragm 26, valve 31, diaphragm 15 and valves 30, 12 and 21 cause a pressure difference, the magnitude of which satisfies the following equation: $0 < dp$ (dp 15−dp 31)$\leq$dp 26$<$dp (dp 15+dp 30)$\leq$dp 12$<<$dp 21.

Here "dp" refers to the pressure difference and the figures are the reference numbers of the component shown in the drawings. The symbol $<<$ means that the term left of the symbol is much smaller than the term on the right of the symbol, and the symbol $\leq$ indicates that the term left of the symbol is smaller or equal to the term right of the symbol.

When the device is connected to the water pipe, the control knob 25 is, depending on the number of consumers or the number of appliances using water, turned to "N"-normal water consumption, "M"-moderate water consumption, or "H"-high water consumption (FIG. 4), so that cam 23 exerts the right pressure on the pressure spring 22 and so that valve 21 will only be opened at a given pressure difference. As a result the water flows, at a specific rate which is dependent on the preset pressure spring 22 exerts on valve 21, directly from the part of the measuring chamber 9 above diaphragm 15, to discharge chamber 6, without limiting the drain volume flow of the regulating device. The shut-off valve 13 will as a result close off faster opening 7 and the water discharge. Subsequently the rotating knob 33 of the flow rate regulating means 32 is turned to a position which corresponds to a specific period of use, for example between 2 and 7 minutes, after which period the device will shut off the water supply after the preset time has elapsed. Similarly knob 37 of the flow regulator 36 is turned to the desired position, determining the flow length and consequently the flow which can pass through the device without the device reacting. The device returns automatically to the reset phase when the water supply is interrupted. This occurs as a result of the pressure in the outlet 3 and above the precontrol diaphragm 26 becoming almost so high as the pressure in inlet 2. Consequently the precontrol diaphragm 26 in the precontrol chamber 11 falls and water flows from inlet 2, through the supply chamber 4, opening 8 and opening 27, which is now open, into the upper part of the precontrol chamber 11, and runs further via channel 28, valve 31 which has opened as a result of the water pressure, and opening 29 into the upper part of measuring chamber 9. As the pressure above and below the measuring diaphragm 15 is now virtually the same, less the pressure loss in valve 31, the measuring diaphragm 15 falls until opening 27 is closed, so that the device returns smoothly to its initial position.

When the water supply is closed off by cut-off valve 13, the device, as shown in FIGS. 4 to 10, can only be returned to the reset phase by pressing on push-button 18 which in turn presses the reset valve 16 down, with the result that this reset valve admits water via the hollow rod 14 and the pressure above and below the valve is equalized. Subsequently the valve and the measuring diaphragm 15 connected to it return completely to the initial position as described above.

When, for example, only a minimum quantity of water is used or one of the connected appliances starts to leak, a small pressure difference arises between inlet 2 and outlet 3. As a result the pressure in the device will not be large enough to open the ball valve 12 and valve 21. The water flowing into the supply chamber 4 then runs via openings 8 and 10 into measuring chamber 9. As a result precontrol diaphragm 26, which has the lowest resistance, rises, which leads to the upper part of the precontrol chamber 11 emptying through channel 35, and opening 27 being closed. Subsequently diaphragm 15, which has a slightly greater resistance than precontrol diaphragm 26, begins to rise, so that the upper part of the measuring chamber 9 empties through opening 29, the flow rate regulating means 32, the ball valve 30 which has been pushed open, the discharge chamber 6, opening 7 and outlet 3. After the diaphragm 15 has risen and the measuring chamber 9 drained, the shut-off valve 13 closes opening 7 and the water supply is turned off. Because of the low rate of flow, ball valve 12 is not opened by this operation. With very low rates of consumption it is always assumed that this consumption is greater than the rate set by the flow regulator 36. When water consumption is normal, however, the pressure difference between inlet 2 and outlet 3 of the device is greater than is the case with a low water consumption or a leak in one of the connected appliances. In this case when the precontrol diaphragm 26 with the lowest resistance has closed off the opening 27 between the measuring chamber 9 and the precontrol chamber 11 and the diaphragm 15 in the measuring chamber 9 has started to rise, the ball valve 12 will also be opened by the greater pressure, as indicated by the broken lines in FIG. 2. As a result the water flows rapidly out of the supply chamber 4, opening 5, the discharge chamber 6 and opening 7 and consequently to outlet 3. After a period preset by the flow regulating means 32, the shut-off valve 13 will shut off opening 7 and consequently the water supply. If consumption or the water take-off stops before the shut-off, the device will automatically return to the reset phase and again assume the initial position as described above, which once again allows the same consumption without difficulty.

Should there be a break in the water circuit of one of the connected appliances, the pressure difference between inlet 2 and outlet 3 will become so high that valve 21 also makes opening 20 free. The operation of the device is the same as with normal water consumption with the exception that, as the result of the large pressure difference, the measuring chamber 9 empties quickly through opening 20 which is opened as a result of the raising of valve 21, and that the draining of measuring chamber 9 is not limited by the flow regulating means 32. Diaphragm 15 is thus very quickly raised as a result of the pressure exerted by the water entering the lower part of the measuring chamber 9. The shut-off valve 13 fitted on diaphragm 15 will therefore very quickly shut opening 7 between discharge chamber 6 and outlet 3, and consequently shut off the water supply, preventing damage. In order to draw water again after the break has been repaired, the reset valve 16 is pressed down by means of push-button 18, making the entire device ready for use again.

It goes without saying that the shape, the dimensions and arrangement of the parts described above with respect to one another can differ and that moreover some of these parts may be replaced by others which serve the same purpose.

I claim:

1. Safety device for water-pipes, comprising a housing with an inlet connected to a water supply pipe and with an outlet connected to a water discharge pipe, in said housing a supply chamber connected to a discharge chamber leading into said outlet, said supply chamber being also connected to a measuring chamber and a precontrol chamber, a valve provided between said supply and discharge chambers, a shut-off valve provided between said discharge chamber and said outlet, said shut-off valve forming part of a diaphragm provided in said measuring chamber, a push-down reset valve provided in said discharge chamber to apply pressure to said outlet and to open said shut-off valve, a push-button for pressing down said reset valve, and adjustable valve provided between said discharge chamber and the upper part of said measuring chamber for setting the desired water consumption, a precontrol diaphragm provided in said precontrol chamber for closing off an opening provided between this chamber and said measuring chamber, a channel provided between said discharge chamber and said precontrol chamber, a second channel provided between said discharge chamber and said precontrol chamber, an opening provided between said measuring chamber and first mentioned channel, a valve for closing first mentioned channel between said precontrol chamber and last mentioned opening of said measuring chamber, a regulating means for regulating the flow rate between said measuring chamber and said discharge chamber and for adjusting the shut-off speed of said shut-off valve, and a flow regulator provided between the upper part of said precontrol chamber and said discharge chamber for adjusting the flow in the by-pass connection of the device.

2. Safety device as defined in claim 1, in which the shut-off valve is fixed on a hollow rod on which the diaphragm provided in the measuring chamber is also fitted and through which the hollow rod runs, said shut-off valve has on the one hand a hollow space in which the hollow rod issues and the reset valve is fitted, and on the other hand an opening through which the reset valve pokes through to the outside, a pressure spring is fitted in said hollow space to hold said reset valve in said opening in the closed position, perpendicular openings are provided in said reset valve connecting said hollow space of the reset valve to the discharge chamber in the pushed-in position of said valve, and a push-button is provided with pressure spring located axially above said reset valve for pushing in and maintaining this valve in an open position.

3. Safety device as defined in claim 1, in which the adjustable valve has a pressure spring for closing the valve, a cam rotating on a spindle for adjusting the pressure of the spring and a knob for setting said cam in a number of positions.

4. Safety device as defined in claim 1, in which the regulating means and the flow regulator is a constant flow regulator with a time calibrated scale.

5. Safety device as defined in claim 1, in which a ball valve is provided between the flow regulating means and the discharge chamber, which ball valve has a specific gravity approaching that of water, so that there is virtually no pressure difference above and below the said valve.

* * * * *